United States Patent Office 3,776,947
Patented Dec. 4, 1973

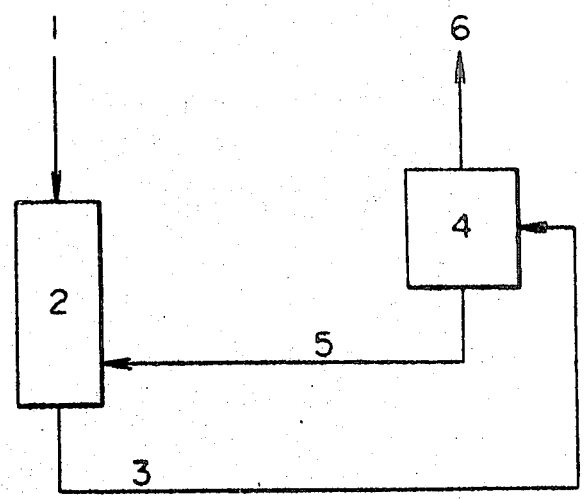

3,776,947
CONTINUOUS ESTERIFICATION PROCESS
Noboru Shimizu, Ibaraki, Sadao Yoshida, Suita, Kunihiro Kubota, Takatsuki, Daizo Kobayashi, Osaka-fu, and Takashi Ohara, Nishinomiya, Japan, assignors to Nippon Shokubai Kagaku Kogyo Co., Ltd., Osaka, Japan
Filed Oct. 10, 1972, Ser. No. 295,811
Int. Cl. C07c 69/54
U.S. Cl. 260—486 R        3 Claims

ABSTRACT OF THE DISCLOSURE

In the process for continuously preparing acrylic acid esters or methacrylic acid esters by reacting acrylic acid or methacrylic acid with an excess of either methanol or ethanol in the liquid phase in the presence of an acidic catalyst, the method characterized in that the acrylic acid or methacrylic acid and alcohol are reacted in the reaction zone at a molar ratio of 1:1.2–5.0 at a temperature of 40–100° C.; in heating the resulting reaction product in an evaporating still to distill off the acrylic acid ester or methacrylic acid ester, water and alcohol, the concentration of the acrylic acid or methacrylic acid of the bottom liquid inside the evaporating still is maintained at 10–40% by weight; and the bottom liquid in an amount of at least 0.4 times by weight of the total amount of the acrylic acid or methacrylic acid and alcohol fed to the reaction zone is recycled from the evaporating still to the reaction zone.

---

This invention relates to improvements in the continuous preparation of methyl acrylate, methyl methacrylate, ethyl acrylate or ethyl methacrylate. More particularly, the invention relates to a process by which the direct esterification reaction of acrylic acid or methacrylic acid [hereinafter to be generically referred to, at times, as (meth)acrylic acids] with methanol or ethanol is carried out to continuously prepare the methyl or ethyl esters of acrylic or methacrylic acid [hereinafter to be generically referred to, at times, as methyl or ethyl (meth)acrylate].

In general, the esterification reaction of a carboxylic acid with an alcohol is known as an equilibrium reaction, with the consequence that the rate of conversion of the acid or alcohol to the ester is imposed a restriction by the equilibrium constant. Hence, the unreacted starting material must be isolated from the product ester and be recovered from the reaction system. Especially, in the case of the (meth)acrylic acids to which the present invention pertains, in view of their costliness, it is of the utmost importance that the unreacted protion be effectively recovered and refused. However, in isolating and recovering the (meth)acrylic acids from the esterification reaction mixture and purification of the recovered acid for reuse, a great efficiency cannot be expected from the standpoint of the equipment or utilities involved. Hence, various difficulties are foreseen for putting this method into practice.

For instance, with a view to enhance the conversion of the (meth)acrylic acids to the esters, such methods as causing the presence in the reaction system of a great excess of alcohol to the (meth)acrylic acid or of preferentially extracting the (meth)acrylic acid ester formed during the reaction with a solvent such as a hydrocarbon have been suggested. Again, as another method for achieving the same object, there is a proposal to eliminate the water in the reaction product by the use of an entrainer. However, a greater excess of alcohol must be recovered, or complicated operations such as the necessity of isolation of the extraction solvent or entrainer are involved.

It is therefore the object of the present invention to provide a process that does not possess the foregoing drawbacks in carrying out the continuous preparation of methyl or ethyl (meth)acrylate from (meth)acrylic acid and methanol or ethanol.

In accordance with the present invention, the foregoing object is achieved by a new process wherein in reacting (meth)acrylic acid with either methanol or ethanol in the liquid phase in the presence of an acidic catalyst to continuously prepare the (meth)acrylic acid ester, the process is characterized in that (1) the (meth)acrylic acid and alcohol are reacted in the reaction zone in a molar ratio of 1:1.2–5.0 at a temperature of 40–100° C.; (2) in heating the resulting reaction product in an evaporating still to distill the (meth)acrylic acid ester, water and alcohol, the (meth)acrylic acid concentration of the bottom liquid inside the evaporating still is maintained at 10–40% by weight; and (3) the bottom liquid in an amount of at least 0.4 times by weight of the amount of the starting material, i.e., the total weight of the (meth)acrylic acid and alcohol, fed to the reaction zone is recycled from the evaporating still to the reaction zone. The reaction zone, in the present invention, consists of one or more reactors. The evaporating still as used hereinabove is a setup comprising an evaporator in the usual sense and, in addition, a distillation column of a simple structure. And the bottom liquid is meant to be the liquid that is present at the bottom of the evaporating still.

In general, in the continuous process of preparing (meth)acrylic acid ester, the (meth)acrylic acid and alcohol are reacted in the reactor containing an esterification catalyst and being maintained at a given temperature, after which the reaction product containing unreacted (meth)acrylic acid is conveyed to the distillation column where (meth)acrylic acid ester, water and unreacted alcohol are distilled off from the top, and the unreacted (meth)acrylic acid solution containing other high boiling materials is drawn from the bottom. And the (meth)-acrylic acid solution obtained is recycled to the reactor through the separation and purification steps. In the conventional process such as described, it is, however, necessary to increase the number of plates or the reflux ratio, when the unreacted (meth)acrylic acid is recovered from the reaction product and purified in distillation column. Further, when the concentration of (meth)acrylic acid in the bottom liquid is increased in the case of flash distillation, (meth)acrylic acid comes mixed in the distillate to result in a loss of the costly (meth)acrylic acid. Furthermore, since (meth)acrylic acid is very readily polymerizable, it becomes necessary to give consideration to prevention its polymerization inside the distillation column when it is to be concentrated by distillation. However, as is apparent from the hereinafter given control experiments, it is difficult to prevent this polymerization and ensure the stable operation of distillation by the use of the usual polymerization inhibitors.

On the other hand, in accordance with the present invention, any type of evaporator or the distillation column of simple construction can be used for the separation of the esterified products by maintaining the concentration of the (meth)acrylic acid in the range of 10–40 weight percent, preferably 13–30 weight percent. Consequently, it is possible to distill off the (meth)acrylic acid ester, water and unreacted alcohol which do not substantially contained any (meth)acrylic acid without any troubles due to the polymerization of the (meth)acrylic acid and its ester.

The bottom liquid in an amount of at least 0.4 times by weight of the starting materials newly fed to the reaction zone, i.e., the total amount of the newly fed (methyl)

acrylic acid and alcohol, is recycled to the reaction zone in the present invention. When the amount of the bottom liquid is less than this, there is no sense in recycling the bottom liquid, since the composition of the liquid in the reactor hardly differs from that before the mixture has been made. In other words, it is uneconomical in this case to heat a reaction mixture of a composition close to the equilibrium point for a prolonged period of time at a low reaction velocity as in the case where the reaction is carried out without recycling the bottom liquid. Therefore, there is another drawback in that the amount of alkoxy compounds of the (meth)acrylic acid esters formed as by-products increases. Hence, the recycling of the bottom liquid in a greater amount is more effective in increasing the velocity of the reaction. However, when the amount of the bottom liquid recycled exceeds 5 times by weight of the starting material fed to the reaction zone, a proportionately promoting effect cannot be noted.

The bottom liquid may be fed back to any point of the reaction zone between the inlet thereto and the point thereof at which the rate of conversion of the (methyl)acrylic acid has reached equilibrium. However, it is most preferred that the feed back is made to that point where the residence time of the (meth)acrylic acid becomes the shortest. If the residence time of (meth)acrylic acid is reduced to its minimum, the formation of the alkoxy compounds of the (meth)acrylic esters, the by-products of the esterification reaction, can be controlled to a minmum, and the scale of the reactor can be made as small as possible. The rate of conversion as herein used is defined by the form I:

Conversion (percent)

$$= \frac{\text{Number of moles of (meth)acrylic ester in the reaction product}}{\text{Number of moles of (meth)acrylic acid and (meth)acrylic acid ester in starting material fed}} \times 100$$

(Form I)

The esterification reaction is carried out at a temperature of 40–100° C., preferably 50–90° C. If the temperature is too high, polymerization of the (meth)acrylic acid tends to take place, whereas if the temperature is too low, the reaction velocity becomes slow.

A reaction pressure which is sufficient to maintain the reaction system in the liquid phase will do. Usually employed is normal atmospheric pressure or slightly higher pressure.

As catalyst, usable are the acidic catalysts, for example the liquid catalysts such, as paratoluenesulfonic acid, sulfuric acid and hydrochloric acid and solid catalysts such as the acidic ion-exchange resins. As convenient catalysts that give satisfactory results in the present invention, included are the polystyrene-derived sulfonic acid type cationic ion-exchange resin such, for example, as Amberlite IR-20 (Rohm & Haas Co. product), Dowex 50W (Dow Chemical Co. product) and Diaion (Mitsubishi Chemical Co. product).

The esterification reaction is preferably carried out in the presence of a suitable polymerization inhibitor. As the polymerization inhibitor, any of those customarily used such as hydroquinone, methylene blue, hydroquinone monomethyl ether, phenothiazine, etc. can be used.

The starting methanol or ethanol may be one which contains some water or the corresponding (meth)acrylic acid ester. The (meth)acrylic acid and alcohol must be present in the reaction zone at a molar ratio of 1:1.2–5.0, preferably 1:1.5–3.0. When the alcohol is used in an amount less than the foregoing range, the reaction velocity becomes slow, with the consequence that difficulties are experienced in achieving the complete conversion of the (meth)acrylic acid to ester. On the other hand, when the alcohol is used in an amount in excess of the range specified above, it is expensive for recovering the alcohol. The molar ratio as herein used is defined as follows:

Molar ratio $$= \frac{\text{Number of moles of alcohol and (meth)acrylic acid ester}}{\text{Number of moles of (meth)acrylic acid and (meth)acrylic acid ester}}$$

(Form II)

The invention process will become still more apparent by referring to the accompanying drawing which represents a flow sheet of the process.

The (meth)acrylic acid and alcohol are fed to a reactor 2 via line 1. The (meth)acrylic acid is esterified in this reactor, and a mixture of the resulting (methyl)acrylic acid ester, the reaction product, and water, as well as the unreacted (meth)acrylic acid and alcohol is conducted via line 3 to an evaporating still 4, at which (meth)acrylic acid ester in an amount corresponding to the (meth)acrylic acid fed afresh to the reactor 2, water and alcohol are distilled off via line 6. On the other hand, the bottom liquid is recycled via line 5 to the reactor 2.

The bottom liquid contains, at times, a small amount of such impurities as polymerized materials and high boiling compounds. In such cases, it is desirable to remove these impurities from the reaction system to prevent their accumulation in the system. For accomplishing this, the bottom liquid may, as required, be purified by such purification means as a film evaporator and thereafter recycled to the reaction zone consisting of one or more reactors.

As the reactor, one which is so adapted that the reaction liquid flows in piston-flow type will do, but in the case a liquid catalyst is used, a pipe reactor may be used. In the case a solid catalyst is to be used, the flow inside the reactor may be upwardly but preferred is one in which the flow is downwardly. For carrying out the invention process conveniently, it is preferred that the solid catalyst is divided into at least two separate reaction layers which may be placed in one or more reactors separately and that the bottom liquid is fed back to between the so divided at least two layers.

As previously noted, any type of evaporator can be used for the flash distillation in the present invention. For example, flash column equipped with a multi-tubular heat exchanger or distillation column of simple construction which has few stages of trays or a few feet of packed heights is usually used.

Now, when the foregoing discussion is summarized, it is as follows:

The process of the present invention is directed to the continuous preparation of (meth)acrylic acid esters by reacting (meth)acrylic acid with either methanol or ethanol in a reaction zone at a molar ratio of 1:1.2–5.0 in the liquid phase at a temperature of 40–100° C. in the presence of an acidic esterification catalyst, conveying the resulting reaction product to an evaporating still and submitting same to flash distillation to distill off from the evaporating still (meth)acrylic acid ester in an amount corresponding to the amount of (meth)acrylic acid fed to the reactor, as well as water and unreacted alcohol, and recycling the (meth)acrylic acid-containing bottom liquid to the reaction zone for submission of same of the esterification reaction. In carrying out the foregoing steps in preparing the (meth)acrylic acid esters, the process is characterized in that by maintaining the concentration of the (meth)acrylic acid in the bottom liquid at 10–40% by weight (meth)acrylic acid does not substantially distill (meth)acrylic acid in the bottom liquid or in the evaporating still is not checked, and that by adjusting the amount of the bottom liquid to be recycled to an amount at least 0.4 times by weight of the total weight of the (meth)acrylic acid and alcohol freshly fed to the reaction zone the velocity of esterification reaction in the reactor can be optimized, with the consequence that the size of the reactor, the average residence time of the (meth)acrylic acid and the amount of by-product alkoxy compounds of (meth)acrylic acid esters formed can be all reduced to a minimum.

The following examples are given for more specifically illustrating the invention.

EXAMPLE I

The apparatus shown in the accompanying drawing was used, and the experiment was carried out in the following manner.

The reactor was made of stainless steel and of cylindrical shape having an inside diameter of 200 millimeters and a height of 1000 millimeters. Its interior was partitioned into two stages, an upper stage and a lower stage. An upper jacket was provided on the exterior wall of the upper stage, and a lower jacket, on the exterior wall of the lower stage, both for heating purposes. As the esterification catalyst was used a polystyrene-derived sulfonic acid type cationic exchange resin (Dowex 50W), 17 liters of this catalyst being packed in the lower stage and 11 liters of the catalyst being packed in the upper stage.

The reactor was continuously fed from its top a starting material mixture consisting of acrylic acid and methanol (0.8% by weight of water and 23.6% of methyl acrylate being present in this methanol), the acrylic acid being fed at the hourly rate of 4 kg. (55.5 moles) and the methanol being fed at the hourly rate of 5.1 kg. (120.8 moles calculated as methanol). Hydroquinone corresponding to 0.01% by weight of the acrylic acid was added to the starting material as a stabilizer. Further, the inside temperature of the reactor was maintained at 80° C. in upper stage, and 85° C. in lower stage by circulating hot water through the reactor jacket. At that part of the reactor where about 75% of the acrylic acid of the starting material was converted to methyl acrylate (a conversion of 80% according the Form I), the bottom liquid (acrylic acid concentration of 18.9% by weight) from the evaporating still was introduced at the rate of 12.8 kg./hr. In the reaction zone subsequent to where the admixture of the bottom liquid was made, about 28% of the acrylic acid present was converted to methyl acrylate. Hence, the acrylic acid esterified throughout the whole of the reactor reached about 99% of the acrylic acid added afresh to the reactor.

The reaction mixture leaving the reactor was fed to an evaporating still. As this evaporating still was used a flash column of stainless steel having an inside diameter of 200 millimeters and a height of 1000 millimeters, and equipped with a jacket at its bottom for steam heating. Flash distillation was carried out with an atmospheric pressure at a column top, a column top temperature of 75° C. and a column bottom temperature of 82° C. The distillate from the top of the column (9 kg./hr.) contained 65% by weight of methyl acrylate, 23.1% by weight of methanol, 11.4% by weight of water and 0.5% by weight of other components (acrylic acid, methyl methoxypropionate, etc.).

On the other hand, the bottom liquid from the evaporating still was withdrawn at the rate of 12.9 kg./hr. Of this bottom liquid, that amounting to 5 kg./hr. was conveyed to a film evaporator and removed off the high boiling compounds and polymerized materials contained therein, after which the so treated bottom liquid was mixed with the remaining 7.9 kg./hr. portion of the bottom liquid and recycled to the reactor.

The yield of methyl acrylate based on the acrylic acid freshly fed to the reaction system was 97.4 mol percent.

Control I

When the experiment was operated under identical conditions as in Example I but by adjusting the acrylic acid concentration of the bottom liquid to 5% by weight with the intent of greatly reducing the acrylic acid contained in the distillate to be obtained from the evaporating still, the acrylic acid fed to the reactor was not reacted completely therein, with the consequence that the acrylic acid concentration of the bottom liquid became high thereby making it impossible to carry out the operations under steady conditions.

Control II

When the experiment was operated under identical conditions as in Example I but with the acrylic acid concentration of the bottom liquid at 50% by weight, the acrylic acid concentration of the distillate from the evaporating still reached 4.3% under steady conditions, and the loss of acrylic acid as unreacted acrylic acid became 10.6% of the acrylic acid freshly fed to the reactor.

Control III

The distillation was carried out under the conditions indicated in Control II but employing as the evaporator a 15-plate bubble-cap tray column having a diameter of 200 millimeter for reducing the loss of the acrylic acid. A reflux ratio of 2 was used, and hydroquinone was added in an amount of 0.1% by weight to the reflux liquid. However, flooding occurred 130 hours after the start of the distillation. On inspection of the inside of column, it was found that the closest tray to the bottom in the column was clogged considerably.

EXAMPLE II

The same procedure and apparatus as used in Example I were used. A mixture of 3.8 kg./hr. (52.7 moes) of acrylic acid and 5.1 kg./hr. (158.2 moles) of methanol, to which had been added 0.01% by weight, based on the acrylic acid, of hydroquinone, was fed to the reactor maintained at a reaction temperature of 60° C. At that part of the reactor where about 72% of the acrylic acid was converted to methyl acrylate, the bottom liquid from the evaporating still and containing 15.2% by weight of acrylic acid was introduced at the rate of 4.4 kg./hr. In the reaction zone subsequent to where the admixture of the bottom liquid was made, methyl acrylate in an amount corresponding to about 59% of the unreacted acrylic acid present was formed.

The reaction mixture leaving the reactor was conveyed to the evaporating still, and the flash distillation of the reaction mixture was carried out with an atmospheric pressure at a column top, a column top temperature of 76° C. and the column bottom temperature of 83° C. to thus obtain 8.8 kg./hr. of a distillate (50.6% by weight of methyl acrylate, 38.5% by weight of methanol, 10.6% by weight of water, and 0.3% by weight of acrylic acid and methyl methoxypropionate) and 4.5 kg./hr. of the bottom liquid. The yield of the distilled methyl acrylate corresponded to 98.0 mol percent of the acrylic acid freshly fed to the reaction system. Of the withdrawn bottom liquid, 2 kg./hr. was treated with a film evaporator, after which the distillate thereof was recycled to the reactor along with the remaining 2.5 kg./hr. portion of the bottom liquid.

EXAMPLE III

The same apparatus as that of Example 1 was used except that the reactor, which was packed with 45 liters of the same catalyst as that used in Example I, was a cylindrical reactor of stainless steel provided with a jacket for heating and having an inside diameter of 200 millimeters and a height of 2000 millimeters. The reactor was heated at 60° C. The same starting materials as those used in Example II were fed. 17.4 kg./hr. of the bottom liquid from the evaporating still (containing 15.2% by weight of acrylic acid) was recycled, it being fed to the reactor after mixing with the starting materials at the entrance to the reactor. At the exit from the reactor, 12.2% of the acrylic acid fed, inclusive of that which was recycled, was esterified (this corresponds to 99% of the freshly added acrylic acid), following which the reaction mixture was conveyed to the evaporating still. The evaporating still was operated with an atmospheric pressure at column top, a column top temperature of 76° C. and a column bottom temperature of 83° C., whereupon was obtained 8.7 kg./hr. of a distillate consisting of 50.3% by weight of methyl acrylate, 38.5% by weight of methanol, 10.6% by weight of water and 0.6% by weight of other components (acrylic acid, methyl methoxypropionate, etc.). 177.6 kg./hr. of the bottom liquid was withdrawn, of which 25 kg./hr. was treated with a film evaporator. The distillate obtained after this treatment was combined with the remaining 152.6 kg./hr. portion of the bottom liquid and recycled to the reactor. The methyl acrylate contained in the distillate from the evaporating still corresponded to 96.5 mol percent of the freshly fed starting acrylic acid.

EXAMPLE IV

The same reactor as that of Example I was used, its upper stage being packed with 16 liters of a cationic ion-exchange resin (Dowex 50W) and its lower stage being packed with 39 liters of the same resin. The reaction temperature was 75° C. On the other hand, as the evaporating still, a distillation column having two stages of bubble-cap trays was used. A starting mixture consisting of 3.3 kg./hr. (45.6 moles) of acrylic acid and 5.7 kg./hr. of ethanol (7.1% by weight of water and 15.6% by weight of ethyl acrylate being present in this ethanol) (corresponding to 95.9 moles of ethanol) was fed from the top of the reactor. The starting material was incorporated with 0.01% by weight, based on the acrylic acid, of phenothiazine as a stabilizer.

At that part of the reactor where about 64% of the acrylic acid fed was converted to ethyl acrylate (a conversion of 70% according to the Form I), bottom liquid from the evaporating still (containing 20.8% by weight of acrylic acid) was fed at the rate of 27 kg./hr. and mixed with the reaction mixture. In the reaction zone subsequent to where the bottom liquid was mixed, about 16.9% of the unreacted acrylic acid present was esterified. The reaction mixture was then conveyed to the evaporating vessel where it was submitted to flash distillation with an atmospheric pressure at a column top, a column top temperature of 82° C., a column bottom temperature of 92° C. and a reflux ratio of 0.1, whereupon was obtained 8.9 kg./hr. of a distillate consisting of 60% by weight of ethyl acrylate, 25.8% by weight of ethanol, 13.6% by weight of water and 0.6% by weight of other components (acrylic acid, ethyl ethoxypropionate, etc.). The ethyl acrylate contained in the distillate corresponded to 97.5 mol percent of the acrylic acid that was freshly fed to the reaction system.

On the other hand, the bottom liquid was withdrawn at the rate of 27.1 kg./hr., of which 7.1 kg./hr. was treated with a film evaporator, after which the distillate thereof and the remaining 20 kg./hr. portion of the bottom liquid were combined and recycled to the reactor.

EXAMPLE V

In the same apparatus as that used in Example I, the upper and lower stages were packed with 14 and 22 liters, respectively, of a cationic ion-exchange resin (Dowex 50W) and heated at 80° C. The reactor was then fed a starting material consisting of 4.5 kg./hr. (52.3 moles) of methacrylic acid and 4.5 kg./hr. of methanol containing 1.0% by weight of water (corresponding to 139.0 moles of methanol). The starting material was incorporated with 0.01% by weight, based on the methacrylic acid, of hydroquinone.

At a point just past the upper stage catalyst layer, about 80% of the methacrylic acid fed was converted to methyl methacrylate. A mixture consisting of the reaction mixture that had passed through the upper stage catalyst layer and 13.5 kg./hr. of the bottom liquid from the evaporating still (containing 17% by weight of methacrylic acid) was passed through the lower stage catalyst layer. About 27% of the unreacted methacrylic acid present was converted by means of this lower stage catalyst layer. Consequently, the amount of methyl methacrylate formed in the reactor corresponded to about 99% of the freshly fed methacrylic acid.

The reaction product leaving the reactor was conveyed to the evaporating still and was submitted to flash distillation with an atmospheric pressure at a column top, a column top temperature of 81° C. and a column bottom temperature of 90° C. to thus obtain 8.9 kg./hr. of a distillate consisting of 57.5% by weight of methyl methacrylate, 31.2% by weight of methanol, 10.9% by weight of water and 0.4% by weight of methacrylic acid. The methyl methacrylate contained in the distillate corresponded to 97.7% of the methacrylic acid that was freshly fed to the reaction zone.

On the other hand, the bottom liquid was withdrawn at the rate of 13.6 kg./hr. Six kg./hr. of this withdrawn bottom liquid was treated by means of a film evaporator, after which the distillate which had been removed off the high boiling compounds and polymerized material, was recycled to the reactor along with the remaining 7.6 kg./hr. portion of the bottom liquid.

What is claimed is:

1. In the process for continuously preparing acrylic acid esters or methacrylic acid esters by reacting acrylic acid or methacrylic acid with an excess of either methanol or ethanol in the liquid phase in the presence of an acidic catalyst, the method characterized in that the acrylic acid or methacrylic acid and alcohol are reacted in the reaction zone at a molar ratio of 1:1.2–5.0 at a temperature of 40–100° C.; in heating the resulting reaction product in an evaporating still to distill off the acrylic acid ester or methacrylic acid ester, water and alcohol, the concentration of the acrylic acid or methacrylic acid of the bottom liquid inside the evaporating still is maintained at 10–40% by weight; and the bottom liquid in an amount of at least 0.4 times by weight of the total amount of the acrylic acid or methacrylic acid and alcohol fed to the reaction zone is recycled from the evaporating still to the reaction zone.

2. The process according to claim 1 wherein said acidic catalyst is an acidic ion-exchange resin.

3. The process according to claim 2 wherein said ion-exchange resin is charged into at least two separate reaction layers which may be placed in one or more reactors separately, and the bottom liquid from the evaporating still is fed back to between said at least two separate layers.

References Cited

FOREIGN PATENTS 3,639,460  2/1972  Wenzel et al. _____ 260—486 R

LORRAINE A. WEINBERGER, Primary Examiner

P. J. KILLOS, Assistant Examiner

U.S. Cl. X.R.

260—484 R